United States Patent
Marinelli et al.

(10) Patent No.: US 9,626,302 B2
(45) Date of Patent: *Apr. 18, 2017

(54) ENCRYPTING AND DECRYPTING A VIRTUAL DISC

(71) Applicant: International Business Machines Corporation, Armonk, NY (US)

(72) Inventors: Claudio Marinelli, Latina (IT); Luigi Pichetti, Rome (IT); Jacques Fontignie, Perly (CH); Marc V. Stueckelberg, Cartigny (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/920,717

(22) Filed: Oct. 22, 2015

(65) Prior Publication Data

US 2016/0048461 A1 Feb. 18, 2016

Related U.S. Application Data

(63) Continuation of application No. 14/479,475, filed on Sep. 8, 2014, now Pat. No. 9,230,113, which is a (Continued)

(30) Foreign Application Priority Data

Dec. 9, 2010 (EP) .................................... 10194400

(51) Int. Cl.
*H04L 29/06* (2006.01)
*G06F 12/14* (2006.01)
(Continued)

(52) U.S. Cl.
CPC ........ *G06F 12/1408* (2013.01); *G06F 9/4401* (2013.01); *G06F 21/575* (2013.01);
(Continued)

(58) Field of Classification Search
CPC .... G06F 21/602; G06F 21/80; G06F 12/1408; G06F 21/72; G06F 21/575; G06F 9/4401;
(Continued)

(56) References Cited

U.S. PATENT DOCUMENTS 6,098,158 A 8/2000 Lay et al.
6,567,774 B1 5/2003 Lee et al.
(Continued)

FOREIGN PATENT DOCUMENTS

CA 2817109 A1 6/2012
CN 1688981 A 10/2005
(Continued)

OTHER PUBLICATIONS

Suzaki et al. "TPM+Internet Virtual Disk+Platform Trust Services=Internet Client", Thirteenth International Conference on Architectural Support for Programming Language and Operating Systems, ASPLOS 2008, 1 page, http://www.openlab.jp/oscirclar/.
(Continued)

*Primary Examiner* — Kendall Dolly
(74) *Attorney, Agent, or Firm* — Jason H. Sosa

(57) ABSTRACT

Encryption of virtual disc image is accomplished by increasing the size of a virtual disc to support the inclusion of a master boot record and a decryption program. Encrypting portions of a virtual disc image on the virtual disc, but leaving the boot record and decryption program unencrypted and accessible, where the decryption program will decrypt the encrypted portions if the appropriate cryptographic key is supplied. Subsequent decryption is accomplished by initiating a boot sequence through the master boot record, receiving the appropriate cryptographic key, appropriately ordering the decrypted disc image.

7 Claims, 6 Drawing Sheets

Related U.S. Application Data continuation of application No. 13/884,680, filed as application No. PCT/EP2011/069323 on Nov. 3, 2011, now Pat. No. 9,230,118.

(51) Int. Cl.

| | | |
|---|---|---|
| *G06F 21/80* | (2013.01) | |
| *G06F 21/60* | (2013.01) | |
| *G06T 7/00* | (2017.01) | |
| *G06F 9/44* | (2006.01) | |
| *G06F 21/57* | (2013.01) | |
| *G06T 17/00* | (2006.01) | |
| *H04L 9/08* | (2006.01) | |
| *G06F 21/72* | (2013.01) | |

(52) U.S. Cl.
CPC ............ *G06F 21/602* (2013.01); *G06F 21/72* (2013.01); *G06F 21/80* (2013.01); *G06T 7/0075* (2013.01); *G06T 17/00* (2013.01); *H04L 9/0825* (2013.01); *H04L 63/061* (2013.01); *G06F 2212/1052* (2013.01); *G06T 2207/10016* (2013.01); *G06T 2207/20021* (2013.01)

(58) Field of Classification Search
CPC ........... G06F 2212/1052; H04L 63/061; H04L 9/0825; G06T 17/00; G06T 7/0075; G06T 2207/20021; G06T 2207/10016
See application file for complete search history.

(56) References Cited

U.S. PATENT DOCUMENTS

| | | | |
|---|---|---|---|
| 6,857,069 B1 | 2/2005 | Rissmeyer et al. | |
| 6,920,555 B1 | 7/2005 | Peters et al. | |
| 6,925,533 B2 | 8/2005 | Lewis | |
| 6,973,447 B1 | 12/2005 | Aguilar et al. | |
| 7,062,517 B2 | 6/2006 | Kodama | |
| 7,103,747 B2 | 9/2006 | Wilson et al. | |
| 7,269,722 B1 | 9/2007 | Neary | |
| 7,360,072 B1 | 4/2008 | Soltis et al. | |
| 7,379,982 B2 | 5/2008 | Tabbara | |
| 7,428,636 B1* | 9/2008 | Waldspurger | H04L 63/083 713/164 |
| 7,490,197 B2 | 2/2009 | Kirshenbaum et al. | |
| 7,509,530 B2 | 3/2009 | Welts | |
| 7,512,833 B1 | 3/2009 | Murphy et al. | |
| 7,614,050 B2 | 11/2009 | Sasaki et al. | |
| 7,653,794 B2 | 1/2010 | Michael et al. | |
| 7,664,834 B2 | 2/2010 | Keith, Jr. | |
| 7,809,919 B2 | 10/2010 | Thompson | |
| 8,112,505 B1 | 2/2012 | Ben-Shaul et al. | |
| 8,230,095 B2 | 7/2012 | Tsui et al. | |
| 8,510,352 B2 | 8/2013 | Mehra et al. | |
| 8,527,728 B2 | 9/2013 | Clerc et al. | |
| 8,996,667 B2 | 3/2015 | Clerc et al. | |
| 9,052,918 B2 | 6/2015 | Clerc et al. | |
| 9,058,235 B2 | 6/2015 | Fontignie et al. | |
| 2002/0073201 A1 | 6/2002 | French et al. | |
| 2003/0126242 A1 | 7/2003 | Chang | |
| 2003/0191623 A1 | 10/2003 | Salmonsen | |
| 2003/0225986 A1 | 12/2003 | Teshima | |
| 2004/0010708 A1 | 1/2004 | Johnson et al. | |
| 2004/0010787 A1 | 1/2004 | Traut et al. | |
| 2004/0030822 A1* | 2/2004 | Rajan | G06F 3/0605 711/4 |
| 2004/0088367 A1 | 5/2004 | Reinke | |
| 2004/0268345 A1 | 12/2004 | Lodwick et al. | |
| 2005/0160150 A1 | 7/2005 | Kao | |
| 2006/0031547 A1 | 2/2006 | Tsui et al. | |
| 2006/0080385 A1 | 4/2006 | Blandford et al. | |
| 2007/0220494 A1 | 9/2007 | Spooner | |
| 2008/0010639 A1 | 1/2008 | Bestmann | |
| 2008/0027950 A1 | 1/2008 | Fukumi | |
| 2008/0040714 A1 | 2/2008 | Wheeler et al. | |
| 2008/0133208 A1 | 6/2008 | Stringham | |
| 2008/0134175 A1 | 6/2008 | Fitzgerald et al. | |
| 2008/0141015 A1 | 6/2008 | Chalemin et al. | |
| 2008/0155245 A1 | 6/2008 | Lipscombe et al. | |
| 2008/0256219 A1 | 10/2008 | Zhang et al. | |
| 2008/0301425 A1 | 12/2008 | Mittapalli et al. | |
| 2009/0037649 A1 | 2/2009 | Xu | |
| 2009/0049160 A1 | 2/2009 | Cherian et al. | |
| 2009/0100516 A1 | 4/2009 | Ray et al. | |
| 2009/0164994 A1 | 6/2009 | Vasilevsky et al. | |
| 2009/0193245 A1 | 7/2009 | Isaacson | |
| 2009/0240953 A1 | 9/2009 | Paul | |
| 2010/0037235 A1 | 2/2010 | Larimore et al. | |
| 2010/0138827 A1 | 6/2010 | Frank et al. | |
| 2010/0174894 A1 | 7/2010 | Chen et al. | |
| 2010/0205594 A1 | 8/2010 | Jirka | |
| 2011/0137868 A1 | 6/2011 | Sasage et al. | |
| 2011/0219372 A1 | 9/2011 | Agrawal et al. | |
| 2011/0225407 A1 | 9/2011 | Nelson et al. | |
| 2011/0231844 A1 | 9/2011 | Ben-Shaul et al. | |
| 2011/0264776 A1 | 10/2011 | Clerc et al. | |
| 2012/0005467 A1 | 1/2012 | Butler et al. | |
| 2012/0151202 A1 | 6/2012 | Clerc et al. | |
| 2012/0311564 A1 | 12/2012 | Khalid | |
| 2013/0024680 A1 | 1/2013 | Heidingsfeld et al. | |
| 2013/0179856 A1 | 7/2013 | Lam | |
| 2013/0219161 A1 | 8/2013 | Fontignie et al. | |
| 2013/0232329 A1 | 9/2013 | Marinelli et al. | |
| 2013/0247020 A1 | 9/2013 | Fontignie et al. | |
| 2014/0380035 A1 | 12/2014 | Marinelli et al. | |
| 2015/0052508 A1 | 2/2015 | Fontignie et al. | |

FOREIGN PATENT DOCUMENTS

| | | |
|---|---|---|
| CN | 101166116 A | 4/2008 |
| CN | 101256527 A | 9/2008 |
| CN | 101399696 A | 4/2009 |
| CN | 102567042 A | 7/2012 |
| CN | 102591675 A | 7/2012 |
| CN | 103221921 A | 7/2013 |
| CN | 103250134 A | 8/2013 |
| CN | 103250163 A | 8/2013 |
| CN | 102591675 B | 1/2015 |
| CN | 102567042 B | 4/2015 |
| DE | 112011103880 T5 | 8/2013 |
| DE | 112011104325 T5 | 9/2013 |
| DE | 112011104356 B4 | 5/2014 |
| EP | 0770950 A2 | 5/1997 |
| GB | 2499956 A | 9/2013 |
| GB | 2499964 B | 12/2013 |
| GB | 2499963 B | 3/2014 |
| JP | 2000215065 A | 8/2000 |
| JP | 2004192329 A | 7/2004 |
| JP | 2005316809 A | 11/2005 |
| JP | 2006085209 A | 3/2006 |
| JP | 2007310508 A | 11/2007 |
| JP | 2008003815 A | 1/2008 |
| JP | 2008009483 A | 1/2008 |
| JP | 2008033500 A | 2/2008 |
| JP | 2008090546 A | 4/2008 |
| JP | 2008090791 A | 4/2008 |
| JP | 2009245051 A | 10/2009 |
| JP | 2012128839 A | 7/2012 |
| JP | 2012128841 A | 7/2012 |
| JP | 2013543192 A | 11/2013 |
| JP | 2013545204 A | 12/2013 |
| JP | 2014505286 A | 2/2014 |
| JP | 5649184 B2 | 1/2015 |
| SG | 158757 A1 | 2/2010 |
| WO | 02091099 A2 | 11/2002 |
| WO | 2008049008 A2 | 4/2008 |
| WO | WO 2008049008 A2 * | 4/2008 |
| WO | 2008115012 A1 | 9/2008 |
| WO | 2009145274 A1 | 3/2009 |
| WO | 2012069297 A1 | 5/2012 |

(56) References Cited

FOREIGN PATENT DOCUMENTS

| WO | 2012076266 A1 | 6/2012 |
|---|---|---|
| WO | 2012079864 A1 | 6/2012 |

OTHER PUBLICATIONS

"Data Security and Disk Encryption Software Creates Virtual Encrypted Disk on your System", Q Archive, accessed on Apr. 30, 2010, pp. 1-5, http://encrypted-disk.qarchive.org/.

Ni Kai-Bin et al., "Security enchanced virtual disk encryption system and technology", Journal of Computer Applications, vol. 29, No. 11, Nov. 2009, 4 pages.

International Search Report and Written Opinion for PCT/EP2011/069323, dated Mar. 8, 2012, 12 pages.

Black, "Streaming Execution Mode: Application Streaming with VMware® ThinApp™", Information Guide, 2011, pp. 1-8, VMware, Inc.

Clerc et al., "Deploying an operating system," Filed on Apr. 27, 2010, p. 1-26, E.P. Patent Application No. 10425138.4.

Clerc et al., "Management of Multiple Software Images With Relocation of Boot Blocks," Filed on Dec. 14, 2010, p. 1-49, E.P. Patent Application No. 10194866.9.

Clerc et al., "Management of Multiple Software Images With Shared Memory Blocks," Filed on Dec. 14, 2010, p. 1-49, E.P. Patent Application No. 10194864.4.

EDP Weekly, "SANRAD and emBoot team to deliver iSCSI diskless boot," EDP Weekly's IT Monitor, Jul. 18, 2005, Millin Publishing, Inc., Gale Group, 2 pages, http://www.thefreelibrary.com/_/print/PrintArticle.aspx?id=134957464, Accessed on: Apr. 22, 2010.

etherboot.org, "Etherboot/gPXE Wiki," The Etherboot Project Community, Last modified: Mar. 26, 2011, 4 pages, http://etherboot.org/wiki/index.php, Accessed on: Oct. 3, 2014.

Fegreus, "Real Magic with Virtual Snapshots," Open Mag, Mar. 3, 2008, 1 page, http://www.open-mag.com/100348.shtml, Accessed on: Apr. 22, 2010.

Fontignie et al., "Direct Migration of Software Images With Steaming Technique," Filed on Nov. 23, 2010, p. 1-38, E.P. Patent Application No. 10192219.3.

Fontignie et al., "Computer-readable storage mediums for encrypting and decrypting a virtual disc," Filed on Dec. 9, 2010, p. 1-41, E.P. Patent Application No. 10194400.7.

Fontignie et al., "Upgrade of Software Images Based on Streaming Techniqhe," Filed on Dec. 13, 2010, p. 1-39, E.P. Patent Application No. 10194709.1.

Fontignie et al., "Computer-Readable Storage Mediums for Encrypting and Decrypting a Virtual Disc," Filed on Nov. 3, 2011, p. 1-41, I.N. Patent Application No. 4481/CHENP/2013.

Fontignie et al., "Upgrade of Software Images Based on Streaming Technique," filed May 24, 2013, p. 1-42, U.S. Appl. No. 13/989,673.

Fontignie et al., "Encrypting and Decrypting a Virtual Disc," filed Sep. 8, 2014, p. 1-28, U.S. Appl. No. 14/479,475.

Fontignie et al., "Upgrade of Software Images Based on Streaming Technique," filed Sep. 25, 2014, p. 1-43, U.S. Appl. No. 14/496,353.

HP, "HP Image Manager," Product documentation, May 27, 2009, Version 4, Hewlett-Packard Development Company, L.P., 3 pages, http://www8.hp.com/h20195/v2/GetHTML.aspx?docname=c04140545, Accessed on: Oct. 3, 2014.

IBM, "iBoot—Remote Boot over iSCSI," Storage Research, 1 page, https://www.research.ibm.com/haifa/projects/storage/iboot/index.html, Accessed on: Oct. 3, 2014.

IBM System X, "BladeBoot SAN Guide," Software-Based iSCSI Boot SAN Guide for IBM Blades, Jun. 6, 2008, Version 2.02, pp. 1-24, IBM Corp.

Madden, "A better way to manage Citrix servers: Centralized block-level disk image streaming," Block-level Disk Streaming for Citrix Servers, Mar. 2006, pp. 1-9.

Shinder, "What is Dynamic Virtual Client Computing? or, What's the Problem with VDI and Why XP Mode is a Good Thing," WindowsNetworking.com, Sep 8, 2009, 4 pages, TechGenix Ltd., http://www.windowsnetworking.com/articles-tutorials/netgeneral/What-Dynamic-Virtual-Client-Computing-Whats-Problem-VDI-Why-XP-Mode-Good-Thing.html, Accessed on: Apr. 22, 2010.

Van Hensbergen et al., "Dynamic Policy Disk Caching for Storage Networking," IBM Research Report, Nov. 28, 2006, 13 pages, IBM Research Division.

VMware, "VMware Workstation 6.5 Beta Release Notes," ACE Management Server Administrator's Manual, Aug. 14, 2008, Workstation Version 6.5, 8 pages, VMware, Inc., http://www.vmware.com/products/beta/ws/releasenotes_ws65_beta.html, Accessed on: Oct. 3, 2014.

Youngssoft, "CCBoot—Diskless Boot WinXP/Win2003/Vista/Win2008 with iSCSI", Feb. 2009, Quick Start, 15 pages, www.ccboot.com.

Ohta et al., "Trusted Device Framework for Secure Handset Functionality Extension", IPSJ SIG Technical Report, 2005-OS-98 (7), Feb. 23, 2005, pp. 49-56, English Abstract.

Yasuhito Takamiya et al, "Bare Metal" Cloud: A cloud service delivering real machines, IPSJ SIG Technical Report, vol. 2010-HPC-126 No. 39, Aug. 5, 2010, © 2010 Information Processing Society of Japan, pp. 1-8, English Abstract.

* cited by examiner

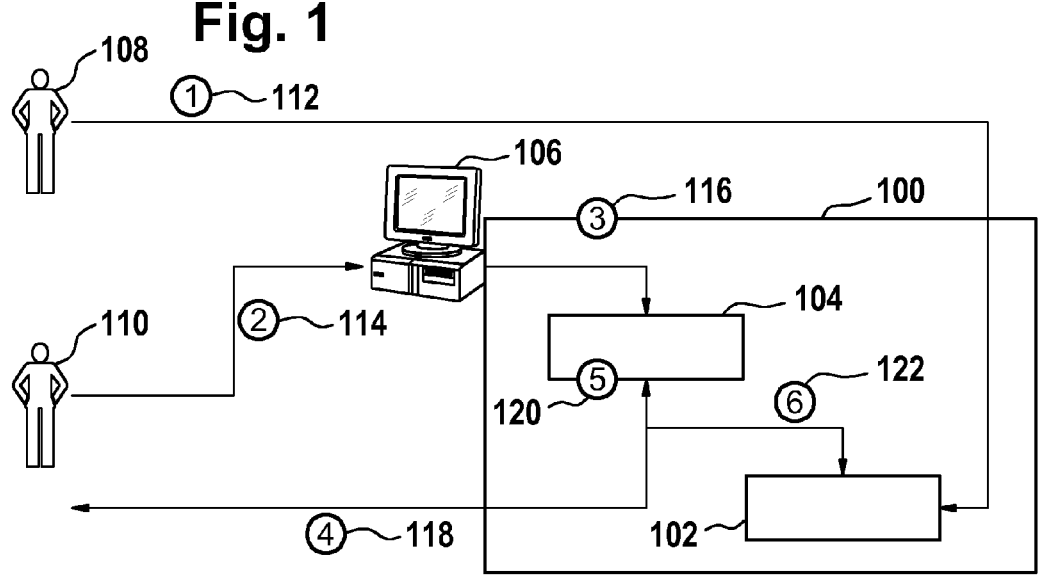
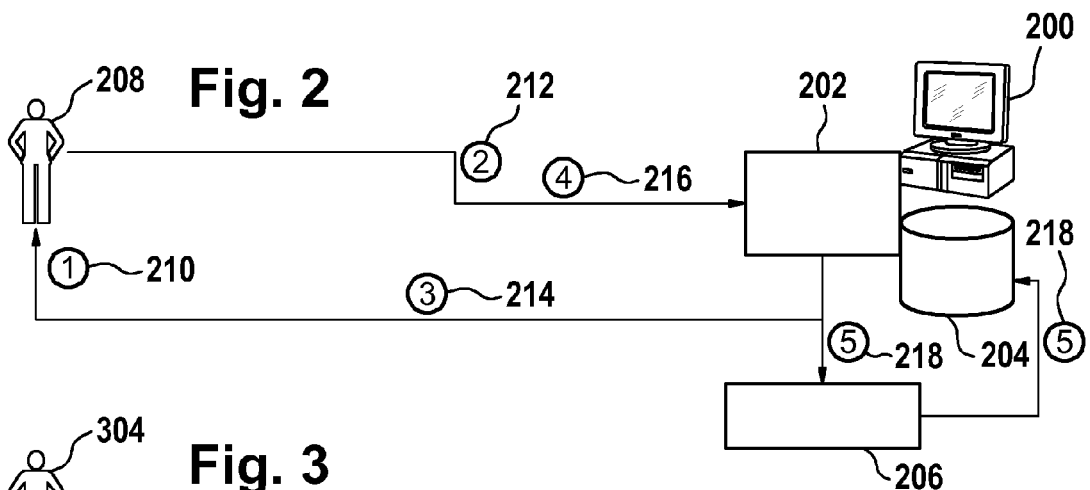
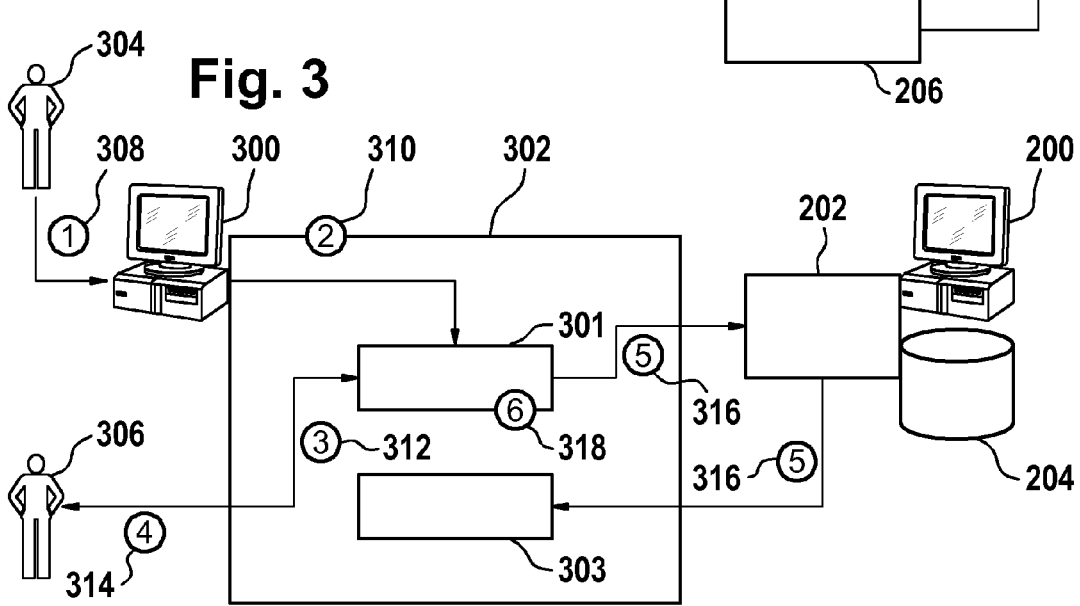

ENCRYPTING AND DECRYPTING A VIRTUAL DISC

FIELD OF THE INVENTION

The invention relates to virtualization software for computer systems. In particular the invention relates to protecting the contents of a virtual disc by encrypting and decrypting the virtual disc.

BACKGROUND

Setting up or installing large numbers of servers and computer systems with specific software and applications using conventional physical resources has become more and more costly. In recent years this process has become simplified by the use of virtualization technologies providing virtual discs or operating systems with preconfigured software packages and system configurations.

If a large number of like configured servers is needed, the same virtual disc can be used over and over again. Virtual disc images may be distributed via the internet. However the packets containing the virtual disc image may contain critical data and licenses. In addition, the unauthorized use of virtual disc images needs to be prevented. Currently the entire disc image is encrypted before being distributed.

SUMMARY OF THE INVENTION

The invention provides a computer-readable storage medium containing instructions for encrypting a virtual disc, a computer-readable storage medium containing instructions for decrypting an encrypted virtual disc, and an encrypted-virtual-disc computer-readable storage medium containing the virtual disc in the independent claims. Embodiments are given in the dependent claims.

Encrypting all of the virtual disc images before distribution has several disadvantages. First a virtual disc image in one format may not be converted into another without being decrypted. Secondly, an administrator is needed to decrypt and install the virtual disc image. This could be a problem, because a cryptographic key or credentials for decrypting the virtual disc image need to be provided to the administrator. The end user or operator of the virtual disc system may or may not wish to share the cryptographic key or credentials with the administrator.

Embodiments of the invention may solve these and other problems by placing an encryption-master-boot-record on the encrypted virtual disc image along with a decryption program for decrypting an at least partially encrypted virtual disc image. The encryption-master-boot-record is a master boot record which is used for booting the virtual machine. The virtual machine then decrypts the encrypted virtual disc image using the decryption program and cryptographic credentials. This eliminates the need to provide the operator with the cryptographic credentials.

Embodiments of the invention may have the advantage that the virtual disc may be encrypted or decrypted from the virtual disc. Embodiments of the invention may have the advantage that the method can be set up to encrypt only used blocks. This results in faster encryption and a reduction in the amount of data to encrypt. Embodiments of the invention may have the advantage that a virtual disc can be encrypted and decrypted on the fly.

Additionally, only portions of the virtual disc may be encrypted. For instance, the blocks of the virtual disc may be selectively encrypted. The portions of the virtual disc which contain data or records specific to a particular format of virtual disc can be left unencrypted. This allows the conversion of the virtual disc without decrypting the virtual disc.

A computer-readable storage medium as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer-readable medium. In some embodiments, a computer-readable storage medium may also be able to store data which is able to be accessed by the processor of the computing device.

Examples of computer-readable storage media include, but are not limited to: a floppy disc, a magnetic hard disc drive, a solid state hard disc, flash memory, a USB thumb drive, Random Access Memory (RAM) memory, Read Only Memory (ROM) memory, an optical disc, a magneto-optical disc, and the register file of the processor. Examples of optical discs include Compact Discs (CD) and Digital Versatile Discs (DVD), for example CD-ROM, CD-RW, CD-R, DVD-ROM, DVD-RW, or DVD-R discs. The term computer-readable storage medium also refers to various types of recording media capable of being accessed by the computer device via a network or communication link. For example a data may be retrieved over a modem, over the internet, or over a local area network.

Computer memory is an example of a computer-readable storage medium. Computer memory is any memory which is directly accessible to a processor. Examples of computer memory include, but are not limited to: RAM memory, registers, and register files.

Computer storage is an example of a computer-readable storage medium. Computer storage is any non-volatile computer-readable storage medium. Examples of computer storage include, but are not limited to: a hard disc drive, a USB thumb drive, a floppy drive, a smart card, a DVD, a CD-ROM, and a solid state hard drive. In some embodiments computer storage may also be computer memory or vice versa.

A computing device or computer system as used herein refers to any device comprising a processor. A processor as used herein encompasses an electronic component which is able to execute a program or machine executable instruction. References to the computing device comprising "a processor" should be interpreted as possibly containing more than one processor. The term computing device should also be interpreted to possibly refer to a collection or network of computing devices each comprising a processor. Many programs have their instructions performed by multiple processors that may be within the same computing device or which may even be distributed across multiple computing devices.

A user interface as used herein is an interface which allows a user or operator to interact with a computer or computer system. A user interface may provide information or data to the operator and/or receive information or data from the operator. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are all examples of receiving information or data from an operator.

Virtualization software, a virtualization program, and a virtualization module as used herein all refer to software or computer executable instructions which allow a computer system to run a virtual computer system. A virtual machine or virtual computer system as used herein encompasses a computer system which is implemented virtually or simulated by software running on a computer system.

A cryptographic key or cryptographic credential as used herein encompasses a key, credential, or password which may be used by a decryption algorithm to decrypt a data file.

A virtual disc as used herein encompasses data which may be used by a virtualization program as a virtual disc image. A virtual disc may contain a file system which may be accessed by the virtualization system or virtual system. A virtual disc may also contain a bootable operating system.

In one aspect the invention provides for a computer-readable storage medium containing machine executable instructions that when executed by a processor cause a processor to encrypt a virtual disc. The virtual disc comprises a virtual disc image. The virtual disc image is an image of an existing disc file system or a disc file system which is constructed for the purpose of creating the virtual disc image. Execution of the machine executable instructions causes the processor to receive the virtual disc. Execution of the machine executable instructions further causes the processor to increase the size of the virtual disc. The virtual disc may essentially be a file stored on the computer-readable storage medium or a different computer-readable storage medium. The size of the virtual disc may be increased by adding blocks at the beginning or the end of the virtual disc. Execution of the machine executable instructions further cause the processor to write a decryption-master-boot-record and a decryption program to the virtual disc. The decryption-master-boot-record is a master boot record that a virtual computer or computer system boots into when using the virtual disc image. The decryption-master-boot-record allows the virtual computer system to run the decryption program for decrypting the virtual disc. Execution of the machine executable instructions further causes the processor to encrypt at least a portion of the virtual disc image. The decryption program comprises decryption-machine-executable-instructions for decrypting the at least partially encrypted virtual disc image in accordance with a cryptographic key. The virtual disc image is encrypted such that the virtual disc image may be decrypted using the decryption program in accordance with the cryptographic key.

In some embodiments the entire virtual disc image is encrypted. In other embodiments only certain portions of the virtual disc image are encrypted. For instance, if portions of the virtual disc are unused, these portions of the disc image need not be encrypted. It may also be able to be determined if certain portions of the virtual disc contain sensitive information that will be desirable to protect by encryption, for instance application programs or sensitive data. The decryption of the virtual disc image could be speeded up by selectively using those portions of the virtual disc which need to be protected and not encrypting those portions which do not need to be protected.

Embodiments of the invention have several advantages. For instance, adding the decryption-master-boot-record to the virtual disc and the decryption program enables an end user to perform the decryption of the virtual disc image. This eliminates the need for an administrator to perform this task.

In another embodiment the virtual disc image is divided into first and second parts. The virtual disc is divided into first, second, third, fourth, and fifth portions. The virtual disc image originally spans the first, second, and third portions of the virtual disc. The second part of the virtual disc image is stored in a third portion of the virtual disc. Execution of the instructions further cause the processor to copy the first part of the virtual disc image to a fourth portion of the virtual disc. The first part of the virtual disc image is copied or moved from the first and second portions of the virtual disc to the fourth portion of the virtual disc. The decryption-master-boot-record is written to the first portion of the virtual disc. When the virtual disc is loaded into a virtual system and the virtual system boots into the virtual disc the decryption-master-boot-record will cause the virtual system to run the decryption program.

The decryption program is written to the second portion of the virtual disc. As mentioned above, the first part of the virtual disc image is copied from the first and second portions of the virtual disc. The first part of the virtual disc image is copied from the first and second portions of the virtual disc before the decryption-master-boot-record and the decryption program are written to the first and second portions of the virtual disc respectively. Execution of the instructions further causes the processor to at least partially encrypt the first and second parts of the virtual disc. The size of the virtual disc is increased to create the fourth portion of the virtual disc and a fifth portion of the virtual disc. The size of the fifth portion is larger than or equal to the second portion. The combined size of the first and second portions is less than or equal to the size of the fourth portion. This embodiment of the invention may be advantageous because the decryption-master-boot-record is in the first portion and will cause the virtual system to boot into the decryption program.

In another embodiment the first part of the virtual disc image is encrypted together. In this embodiment the entire first part of the virtual disc image is encrypted as a single encrypted data file.

In another embodiment the second part of the virtual disc image is encrypted together. In this embodiment the second part of the virtual disc image is encrypted as a single data file.

In another embodiment the virtual disc image is divided into blocks. As used herein a block is a portion or sub-division of data of a disc or a virtual disc image. The data in a block is addressable by the disc or the virtual disc. The blocks are selectively encrypted in accordance with a predetermined block encryption list. The block encryption list is a list of blocks which are to be encrypted during the encryption of the virtual disc image. For instance an operator could determine which blocks of the virtual disc image contain data which is desired to be protected by encryption. For instance these blocks may contain sensitive data or information. Likewise these blocks may contain applications for which a license is to be purchased. If the program is transmitted across the internet it would be desirable to protect the executable version of the code or data.

In another embodiment the virtual disc image is divided into blocks. Execution of the instructions causes the processor to examine each of the blocks and create a list of unused blocks. Particular blocks are encrypted only if they are not found in the list unused blocks. This embodiment is particularly advantageous because the computer-readable storage medium avoids encrypting blocks which are not used. Since the blocks are not used there is no need to protect them. In some virtual file systems unused data may be part of the file system but not used. By not encrypting these portions of the file system the virtual disc may be smaller.

The aforementioned embodiments of the computer-readable storage medium also provide for other aspects of the invention. For instance a computer system is provided for by the invention which contains or comprises the machine readable instructions contained on a computer-readable storage medium according to an embodiment of the invention. Likewise execution of the machine executable instructions causes the processor to perform various steps or actions which also provide for a method and computer-implemented methods. The executable instructions on the computer-readable storage medium also provide for a computer program product and/or a computer system.

Another aspect of the invention provides for a computer-readable storage medium containing machine executable instructions that when executed by a processor cause the processor to decrypt an encrypted virtual disc. The virtual disc comprises a decryption-master-boot-record, a decryption program, and an at least partially encrypted virtual disc image. The decryption program comprises decryption-machine-executable-instructions for decrypting the at least partially encrypted virtual disc image in accordance with a cryptographic key. Execution of the machine executable instructions causes the processor to receive the encrypted virtual disc.

Execution of the machine executable instructions further causes the processor to boot a virtual machine using the decryption-master-boot-record. Execution of the machine executable instructions further causes the processor to receive the cryptographic key. The order of receiving the cryptographic key is not critical. For instance the processor could receive the cryptographic key at any point before the virtual disc image is decrypted. Execution of the machine executable instructions further cause the processor to decrypt the at least partially encrypted virtual disc image in accordance with the cryptographic key and the decryption program. The machine executable instructions cause the processor to boot the virtual machine and the virtual machine boots into the operating system on the encrypted virtual disc via the decryption-master-boot-record. This then causes the virtual machine to run the decryption program. The decryption program then decrypts the at least partially encrypted virtual disc image. Both the cryptographic key and the decryption program are needed for decrypting the at least partially encrypted virtual disc image.

In another embodiment the decryption of the at least partially encrypted virtual disc image is performed during deployment of the virtual machine. In the current state of the art an administrator will receive an encrypted virtual disc and the administrator is responsible for decrypting it. This is however undesirable in many circumstances because the end user or operator of the virtual machine relies on an administrator to perform the decryption. Embodiments of the invention may have the advantage that the end user or operator can perform the decryption his or herself.

In another embodiment the virtual disc comprises a first portion containing the decryption-master-boot-record. The virtual disc further comprises a second portion containing the decryption program. The virtual disc further comprises a third portion containing a second part of the virtual disc image. The virtual disc further comprises a fourth portion containing a first part of the virtual disc. The first part of the virtual disc may contain in some embodiments a master boot record for booting into an operating system contained in the virtual disc image. This master boot record in the fourth portion may be used to boot the virtual machine once the decryption of the at least partially encrypted virtual disc is completed.

The virtual disc comprises a fifth portion containing storage space. The size of the fifth portion is larger than the second portion. The combined size of the first and second portions is less than or equal to the size of the fourth portion. The combined size of the first and second portions is less than or equal to the size of the fourth portion. The at least partially encrypted disc image is decrypted by decrypting the second part of the virtual disc image. The at least partially encrypted virtual disc image is further decrypted by copying the decryption program to the fifth portion of the virtual disc. The at least partially encrypted virtual disc image is decrypted by decrypting a portion of the first part of the virtual disc image.

The at least partially encrypted virtual disc image is further decrypted by copying the decrypted portion of the first part of the virtual disc image to the second portion of the virtual disc. The virtual disc image is further decrypted by decrypting the remainder of the first part of the virtual disc image. The virtual disc image is further decrypted by copying the decrypted remainder of the first part of the virtual disc image to the first portion of the virtual disc. Performing the decryption in this manner may have the advantage that the decryption can be interrupted at any point in time. For instance the fifth portion may contain a data file which maintains a status of the decryption process.

In another embodiment execution of the instructions further causes the processor to erase data in the fourth and fifth portions of the virtual disc after copying the decrypted remainder of the first part of the virtual disc image to the first portion of the virtual disc.

In another embodiment execution of the instructions further causes the virtual machine to reboot after decrypting the at least partially encrypted virtual disc image.

The aforementioned embodiments of the computer-readable storage medium also provide for other aspects of the invention. For instance a computer system is provided for by the invention which contains or comprises the machine readable instructions contained on a computer-readable storage medium according to an embodiment of the invention. Likewise execution of the machine executable instructions causes the processor to perform various steps or actions which also provide for a method and computer-implemented methods. The executable instructions on the computer-readable storage medium also provide for a computer program product and/or a computer system.

In another aspect the invention provides for an encrypted-virtual-disc computer-readable storage medium containing a virtual disc. The virtual disc comprises a decryption-master-boot-record, a decryption program, and an at least partially encrypted virtual disc image. The decryption program comprises machine executable instructions for decrypting the at least partially encrypted virtual disc in accordance with a cryptographic key. In other words the combination of the decryption program and the cryptographic key are used for decrypting the at least partially encrypted virtual disc image.

The decryption program comprises machine executable instructions that when executed by a processor cause the processor to receive a cryptographic key. The cryptographic key may in some embodiments be prompted to be entered by the decryption program or the cryptographic key may be passed to the decryption program by another program. For instance virtualization software for running a virtual computer system may pass a cryptographic key on to the decryption program. Further execution of the machine executable instructions of the decryption program cause the processor to decrypt the at least partially encrypted virtual disc image in accordance with the cryptographic key and the decryption program.

In another embodiment the virtual disc comprises a first portion containing the decryption-master-boot-record. The virtual disc further comprises a second portion containing the decryption program. The virtual disc further comprises a third portion containing a second part of the virtual disc image. The virtual disc further comprises a fourth portion containing a first part of the virtual disc. The virtual disc further comprises a fifth portion containing storage space. The size of the fifth portion is larger than or equal to the second portion. The combined size of the first and second portions is less than or equal to the size of the fourth portion.

In another embodiment the at least partially encrypted virtual disc image is decrypted by decrypting the second part of the virtual disc image. The virtual disc is further decrypted by copying the decryption program to the fifth portion of the virtual disc. The virtual disc image is further decrypted by decrypting a portion of the first part of the virtual disc image. The virtual disc is further decrypted by copying the decrypted portion of the first part of the virtual disc image to the second portion of the virtual disc. The virtual disc is further decrypted by copying the decrypted portion of a first part of the virtual disc image to the second portion of the virtual disc. The virtual disc image is further decrypted by decrypting the remaining of the first part of the virtual disc image. The virtual disc image is further decrypted by copying the decrypted remainder of the first part of the virtual disc image to the first portion of the virtual disc.

In another embodiment the virtual disc contains a decryption-status-data-file for storing the progress of the decryption of the at least partially encrypted virtual disc image. Execution of the machine executable instructions of the decryption program further cause the processor to update the decryption-status-data-file during decryption of the at least partially encrypted virtual disc image. Execution of the machine executable instructions of the decryption program further cause the processor to check the decryption-status-data-file when starting the decryption of the at least partially encrypted virtual disc image. By checking the status of the decryption-status-data-file the decryption can be started at an intermediate point if the decryption was originally interrupted.

In another embodiment execution of the instructions further cause the processor to erase data in the fourth and fifth portion of the virtual disc after copying the decrypted remainder of the first part of the virtual disc image to the first portion of the virtual disc.

In another embodiment execution of the instructions further cause a virtual machine executing the decryption program to reboot after decrypting the at least partially encrypted virtual disc image.

The aforementioned embodiments of the computer-readable storage medium also provide for other aspects of the invention. For instance a computer system is provided for by the invention which contains or comprises the machine readable instructions contained on a computer-readable storage medium according to an embodiment of the invention. Likewise execution of the machine executable instructions causes the processor to perform various steps or actions which also provide for a method and computer-implemented methods. The executable instructions on the computer-readable storage medium also provide for a computer program product and/or a computer system.

BRIEF DESCRIPTION OF THE DRAWINGS

In the following, preferred embodiments of the invention will be described in greater detail by way of example only making reference to the drawings in which:

FIG. 1 illustrates the decryption of a virtual disc 100 according to an embodiment of the invention, FIG. 2 illustrates an example of decryption during importation of the virtual system, FIG. 3 illustrates the decryption of the virtual disc image during deployment.

DETAILED DESCRIPTION

Figure 4A:
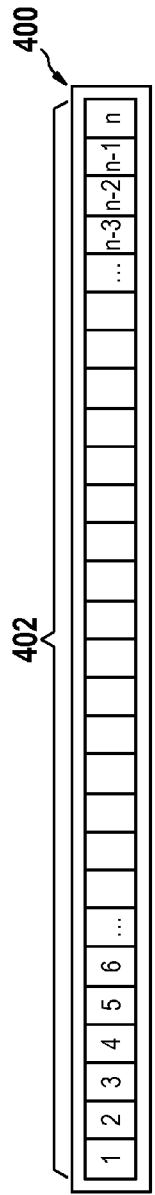
FIGS. 4a-4e illustrate a method of block-based encryption of a virtual disc image according to an embodiment of the invention.

In the following, like numbered elements in these figures are either similar elements or perform an equivalent function. Elements which have been discussed previously will not necessarily be discussed in later figures if the function is equivalent.

FIG. 1 illustrates the decryption of a virtual disc 100 according to an embodiment of the invention. The virtual disc 100 comprises a virtual disc image 102 which is encrypted and a decryption program 104 for decrypting the virtual disc image 102. FIG. 1 also shows a computer system 106 which contains virtualization software for running virtual computer systems or machines. Shown in FIG. 1 is an operator 108 and a user 110. FIG. 1 illustrates the actions taken by the operator 108 and the user 110 when using a virtual disc 100 according to an embodiment of the invention. The steps shown in FIG. 1 are for the first booting of the virtual disc and its decryption. Step 1 is labeled 112. In this step the operator 108 stores the virtual disc 100 on the computer system 106. In step 2 (114), the user 110 boots the virtual machine using the virtualization software on a computer system 106. In step 3 (116), the decryption program 104 starts and requests credentials or a password from the user 110. In step 4 (118), the user 110 provides the credentials or password to the decryption program 104. In step 5 (120), the decryption program 104 decrypts the virtual disc image 102 using the credentials or password. In step 6 (122), the virtual machine reboots and the virtual machine boots from the decrypted virtual disc image 102.

During use of a virtual disc 100, according to an embodiment of the invention, two different use scenarios are possible. There may be decryption during the import of the virtual disc image 102 or there may be decryption during deployment of the virtual disc image 102. If the virtual disc image 102 is decrypted during the importation of the virtual system the operator knows the credentials and passes this to the program or programs for managing the virtual systems. The programs for managing the virtual system then import the image and decrypt it on the fly. For the second possibility for decryption during deployment, the operator does not know the credentials and asks to import the images without decrypting. The virtual disc image is stored in a database of virtual systems. At deployment time the user is prompted for the credentials.

FIG. 2 shows an example of decryption during importation of the virtual system. Shown in FIG. 2 is a computer system 200 that functions as a virtual system image server 202. The virtual system image server 202 serves images of virtual systems when requested by an operator 208. Also stored or able to be accessed by the computer system 200 is a virtual disc repository 204, which is a repository of virtual discs accessible via the virtual system image server 202. There is also a decryption module 206 that is equivalent to the decryption program 104 shown in FIG. 1. In step 1 the operator 208 downloads a virtual disc. In step 2 (212), the operator requests the importation of the virtual disc into the system managed by the virtual system image server 202. In step 3 (214), the virtual system image server 202 requests credentials or a password from the operator 208. In step 4 (216), the operator 208 provides the credentials or passwords to the virtual system image server 202. In step 5 (218), the virtual system image server 202 imports the virtual disc image from the virtual disc and decrypts the virtual disc image on the fly using the credentials or passwords provided by the operator 208.

FIG. 3 illustrates the decryption of the virtual disc image during deployment. Shown in this figure is a computer system 200 with a virtual system image server 202 that manages virtual disc images stored in a virtual disc repository 204. In the example shown in FIG. 3 there is a second computer system 300 that is used for decryption during the deployment of the virtual disc image. The second computer system 300 is for running a target virtual system 302. Within the target system 302 is an operating system deployment tool 301. The operating system deployment tool 301 is provided to deploy a virtual system in a virtual disc image.

Also within the target virtual system is a decryption module 303. The decryption module is a software module or decryption program for decrypting a virtual disc image using a password or a cryptographic credential. An operator 304 and a user 306 are shown. In a first step 1 designated by reference 308, the operator 304 requests or triggers the deployment of a virtual system on the second computer system 300. In a second step 2 (designated by reference 310) the target or virtual system boots on the operating system deployment tool 301. In a third step 3 (designated by reference 312), the operating system deployment tool 301 requests a cryptographic password or credentials from the user 306. In a fourth step 4 (designated by reference 314), the user 306 provides the cryptographic password or credentials to the operating system deployment tool 301. In a fifth step 5 (also referred to as 316), the operating tool downloads and decrypts the virtual disc image using the cryptographic password or credentials and the decryption module 303. In step 6 (also referred to as 318), after the virtual disc image has been decrypted, the deployment of the virtual system continues on the decrypted virtual disc image.

Figure 4B:
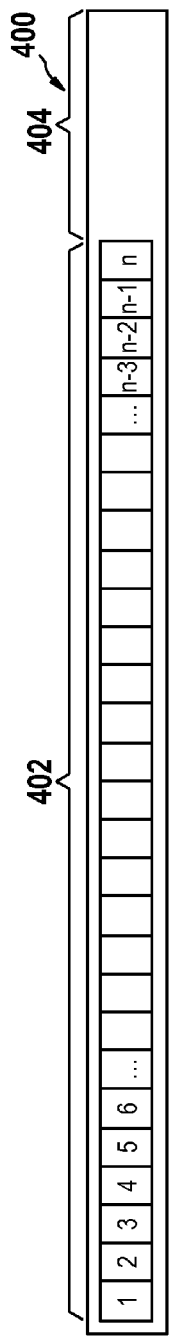
Figure 4C:
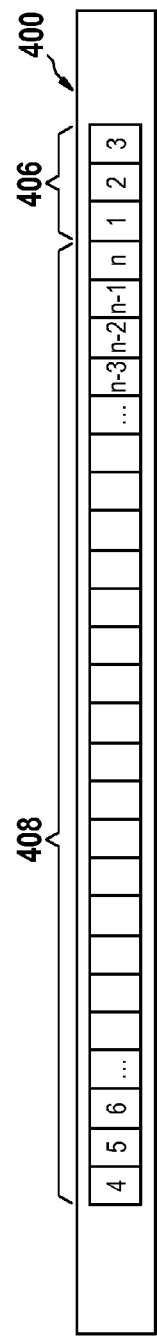

FIGS. 4a to 4e illustrate a method of block-based encryption of a virtual disc image according to an embodiment of the invention. In FIG. 4a, a virtual disc 400 and a virtual disc image 402 are shown. The blocks which make up the virtual disc image are labeled 1-n. To encrypt the virtual disc image the user starts an encryption tool or program. In a first step the decryption tool increases the size of the virtual disc. This is illustrated in FIG. 4b. At the end of the virtual disc 400 a region of empty operating system blocks 404 is created. In a next step the virtual disc image is divided into a first part 406 and a second part 408. The first part of the virtual disc image 406 is copied to the empty operating system blocks 404 at the end of the virtual disc 400.

Figure 4D:
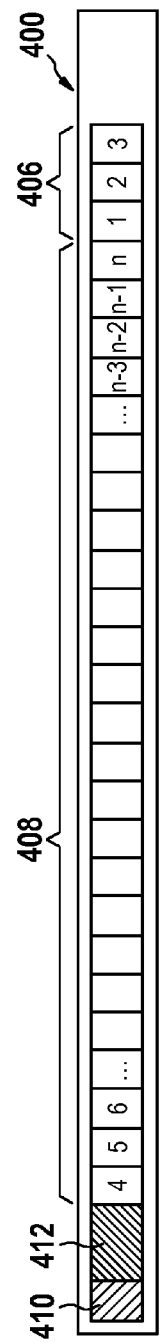
Figure 4E:
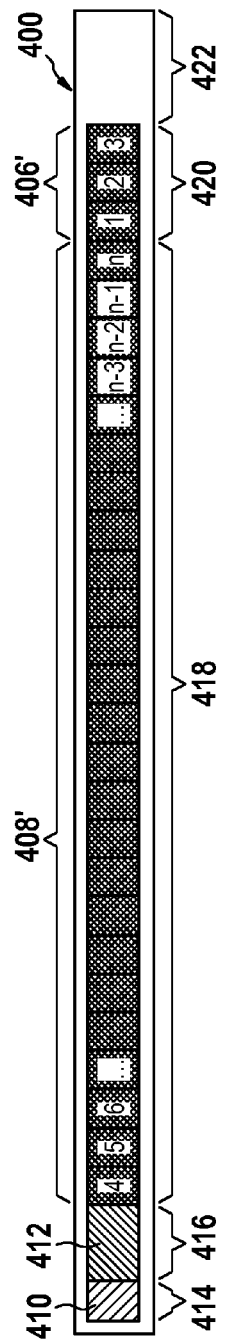

In FIG. 4d, it is shown that the encryption tool copies a decryption master boot record 410 and a decryption program 412 to a first and second part of the virtual disc 400. FIG. 4e illustrates the final step. The encryption tool or software encrypts the first part of the virtual disc image 406' and encrypts the second part of the virtual disc image 408'. All of the blocks of the encrypted virtual disc image 406', 408' may be encrypted or the blocks may be selectively encrypted. In FIG. 4e the virtual disc 400 is also shown as being divided into five portions. The first portion of the virtual disc 414 contains the decryption-master-boot-record 410. The second portion of the virtual disc 416 contains the decryption program 412. The third portion of the virtual disc 418 contains the encrypted 408' second part of the virtual disc image. The fourth portion of the virtual disc 420 contains the encrypted 406' first part of the virtual disc image. The fifth portion of the virtual disc 422 is at the end of the virtual disc 400. In various embodiments the fifth portion 422 may contain data recording the decryption state, journaling data, temporary data used in the decryption, and combinations thereof.

Figure 5A:
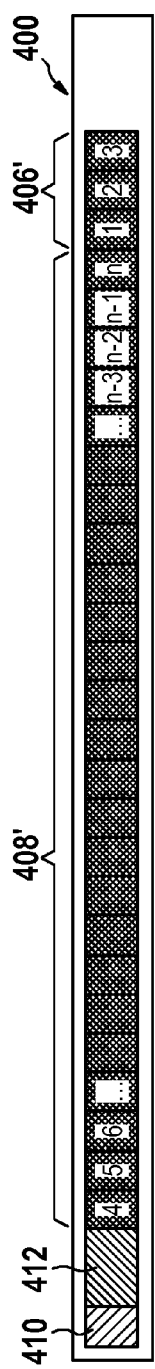
FIGS. 5a-5d illustrate the decryption of the virtual disc image encrypted in FIGS. 4a-4e.
Figure 5B:
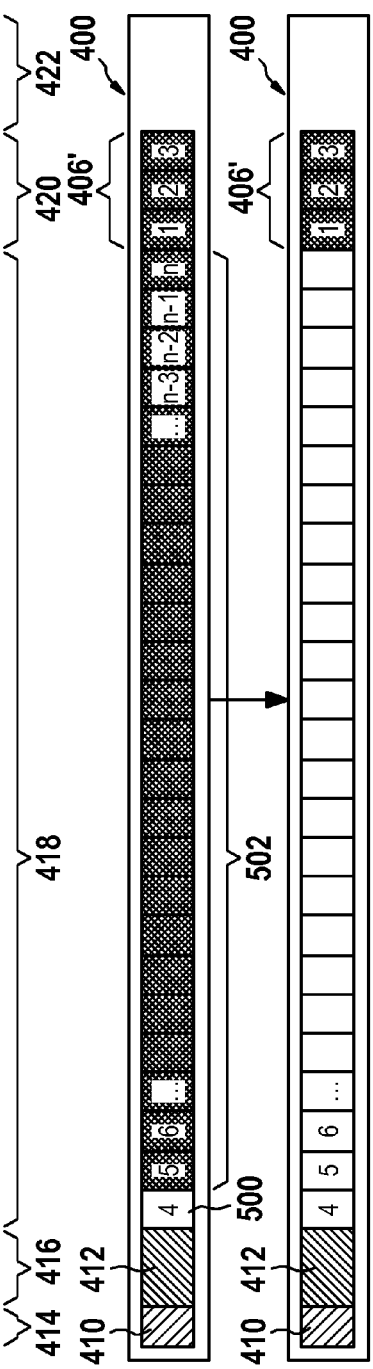

FIGS. 5a-5d illustrate the decryption of the virtual disc image 406', 408' of a virtual disc 400 when booted from a virtual machine. FIG. 5a is identical with FIG. 4e. In a first step the virtual machine boots on the virtual disc 400 and boots into the virtual disc master boot record 410. Next the master boot record 410 loads the decryption program 412. The decryption program 412 then requests cryptographic credentials or a password for use for decrypting the encrypted virtual disc image 406', 408'. In FIG. 5b the decryption process is illustrated. Two different views of the virtual disc 400 are shown. Blocks labeled 500 are decrypted blocks of the second part of the virtual disc image. Blocks labeled 502 are encrypted blocks of the second part of the virtual disc image. In the top view shown in FIG. 5b only the block labeled 4 is a decrypted block 500. The remainder of the second part of the virtual disc image is encrypted. The bottom part of FIG. 5b shows that all blocks of the second part of the virtual disc image 408 are decrypted blocks 500.

Figure 5C:
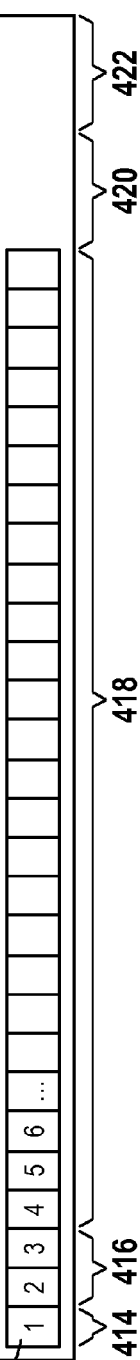
Figure 5D:
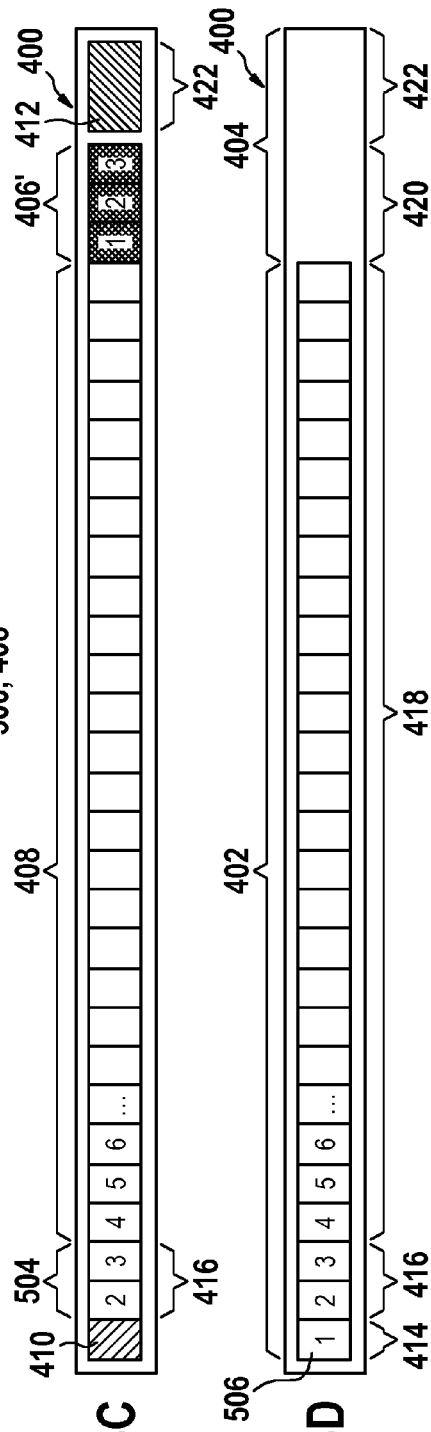

FIG. 5c shows further progress in decrypting the virtual disc 400. After all blocks of the second part of the virtual disc image 408 have been decrypted the decryption program 412 is copied to the fifth portion 422 of the virtual disc. Next a portion of the first part of the virtual disc image 406' is decrypted and copied to the second portion 416 of the virtual disc. The remainder 506 of the first part of the virtual disc image 406' is decrypted and copied to the first portion 414 of the virtual disc. The remainder of the first part of the virtual disc image 506 in this embodiment has overwritten the master boot record 410. The encrypted first part of the virtual disc image 406' and the decryption program 412 may be overwritten leaving empty operating system blocks 404. The Fig. shown in 5d is equivalent with that shown in FIG. 4b. This shows how the method illustrated in FIG. 5 has been used to decrypt the at least partially encrypted virtual disc image 402 of the virtual disc 400.

Figure 6:
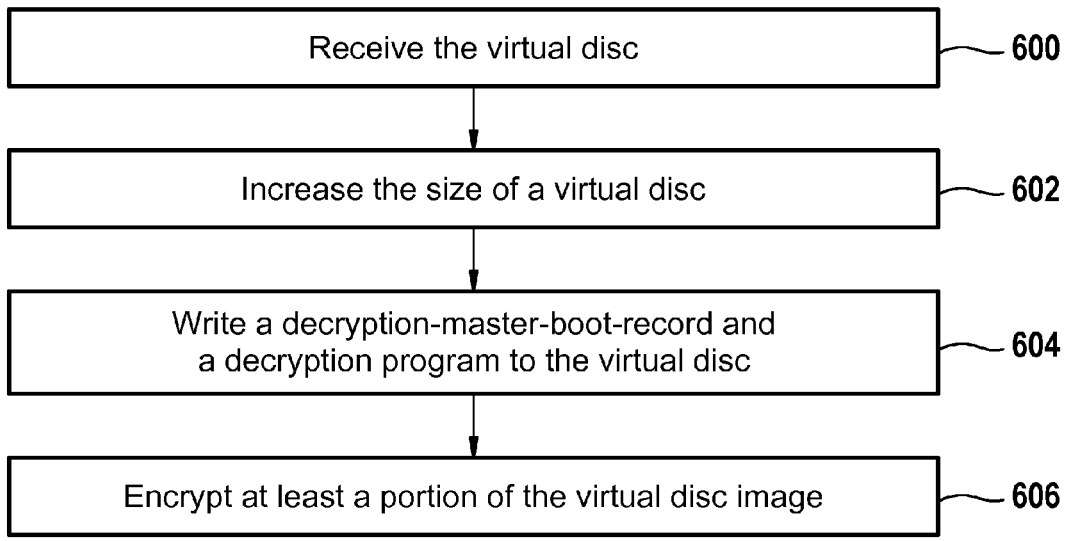
FIG. 6 shows a flow diagram which illustrates a method of encrypting a virtual disc image according to a further embodiment of the invention.

FIG. 6 shows a flow diagram which illustrates an embodiment of encrypting a virtual disc image according to the invention. In step 600 a virtual disc is received. The virtual disc comprises a virtual disc image. In step 602 the size of the virtual disc is increased. In step 604 a decryption-master-boot-record and a decryption program are written to the virtual disc. In step 606 at least a portion of the virtual disc image is encrypted.

Figure 7:
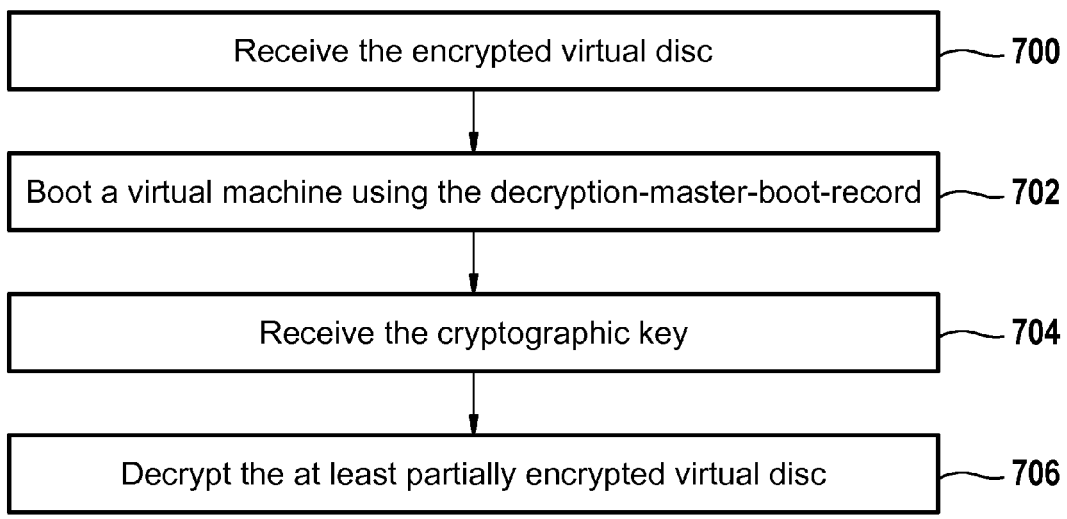
FIG. 7 shows a flow diagram which illustrates a method of decrypting a virtual disc image according to a further embodiment of the invention.

FIG. 7 shows a flow diagram which illustrates a method of decrypting a virtual disc according to an embodiment of the invention. In step 700 an encrypted virtual disc is received. In step 702 a virtual machine is booted using a decryption-master-boot-record contained on the virtual disc. In step 704 a cryptographic key is received. The virtual disc comprises an at least partially encrypted virtual disc. In step 706 the at least partially encrypted virtual disc is decrypted using a decryption program which is on the virtual disc. The decryption program uses the cryptographic key for decrypting with the decryption program for performing the decryption of the at least partially encrypted virtual disc.

Figure 8:
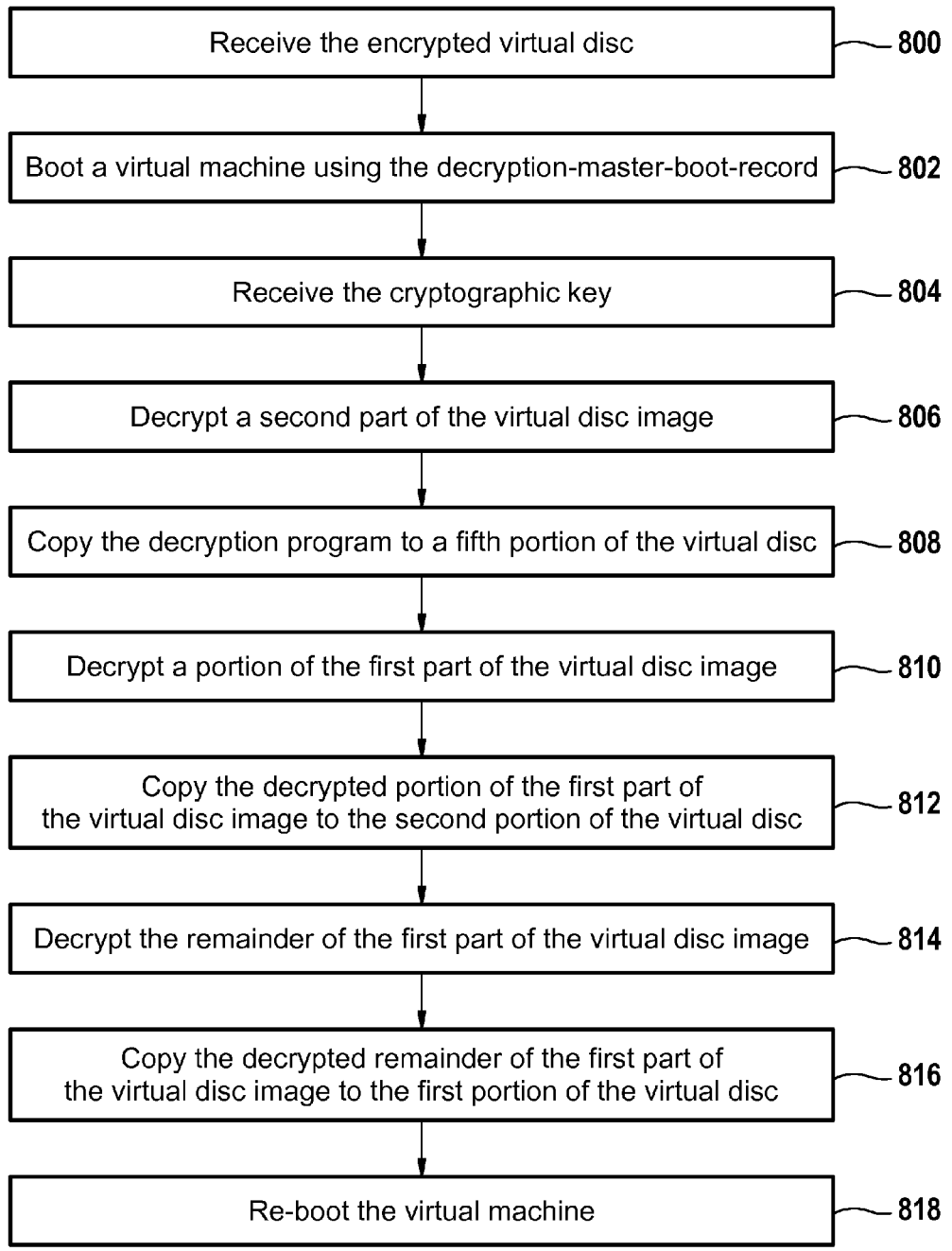
FIG. 8 shows a flow diagram which illustrates a method of decrypting a virtual disc image according to a further embodiment of the invention.

FIG. 8 shows a flow diagram which illustrates a method of decrypting an encrypted virtual disc according to a further embodiment of the invention. In step 800 an encrypted virtual disc is received. In step 802 a virtual machine is booted using the decryption-master-boot-record. In step 804 a cryptographic key is received. In step 806 a second part of the virtual disc image is decrypted using the cryptographic key and a decryption program which is located on the virtual disc. In step 808 the decryption program is copied to a fifth portion of the virtual disc. In step 810 a portion of a first part of the virtual disc image is decrypted. In step 812 the decrypted portion of the first part of the virtual disc image is copied to the second portion of the virtual disc. In step 814 the remainder of the first part of the virtual disc image is decrypted. In step 816 the decrypted remainder of the first part of the virtual disc image is copied to the first portion of the virtual disc. In step 818 the virtual machine is rebooted. The method illustrated in FIG. 8 is analogous to the method illustrated by FIG. 5.

Figure 9:
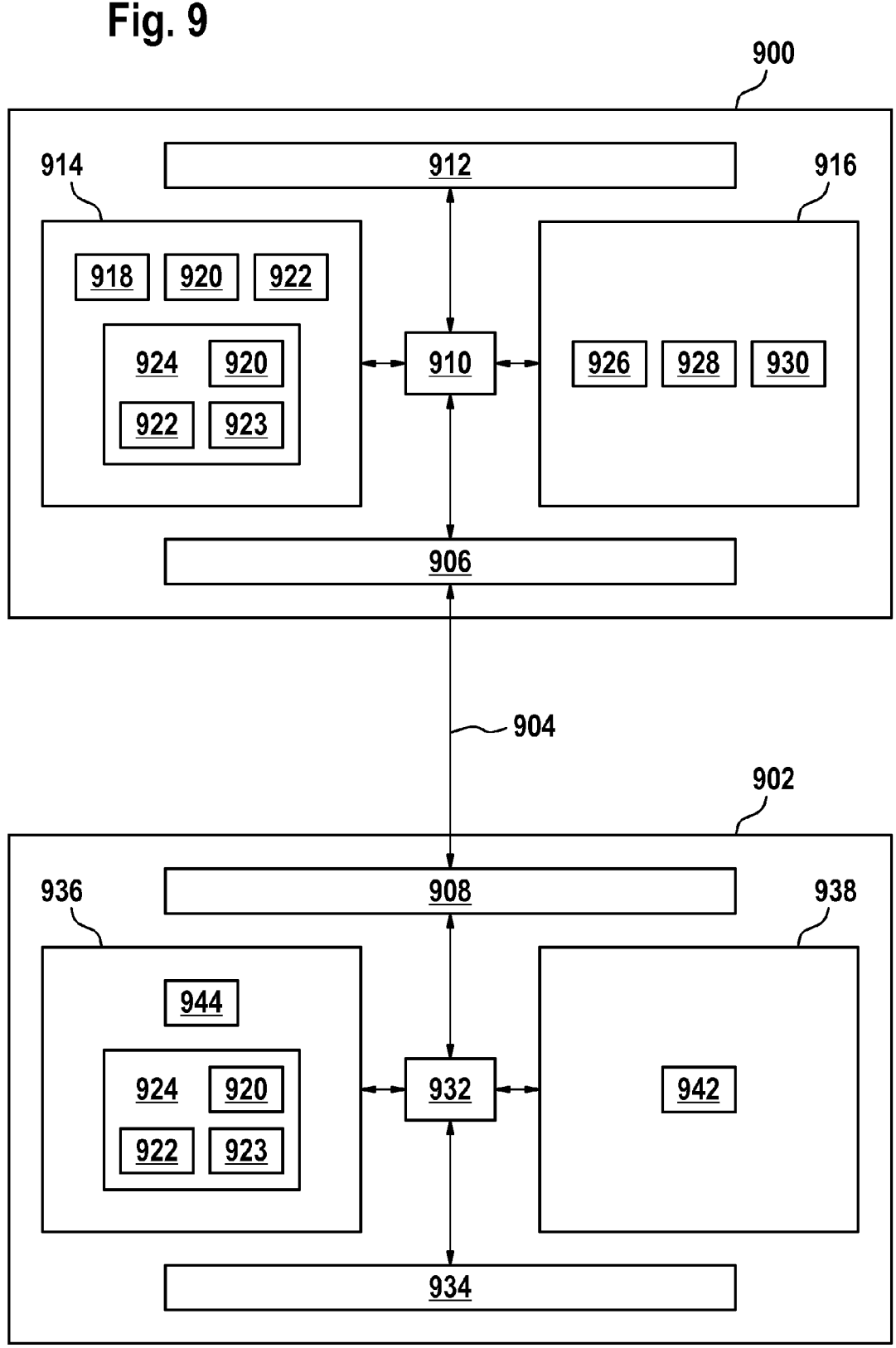
FIG. 9 illustrates a first computer system for encrypting a virtual disc and a second computer system for decrypting a virtual disc.

FIG. 9 shows two computer systems, a first computer system 900 for encrypting a virtual disc and a second computer system 902 for decrypting a virtual disc. There is a network communication 904 between the first computer system 900 and the second computer system 902. The first computer system has a network interface 906 for connecting to the computer network 904 and the second computer system 902 has a network interface 908 for connecting to the computer interface 904. The network connection 904 can be any standard computer interface such as an Ethernet connection or an internet connection. The first computer system 900 has a processor 910 that is connected to a user interface 912 and the network interface 906. The processor 910 is also connected to computer storage 914 and computer memory 916.

Within the computer storage 914 is an unencrypted virtual disc 918. The unencrypted virtual disc contains an unencrypted virtual disc image. Also within the computer storage 914 is a decryption-master-boot-record 920. Also within the computer storage 914 is a decryption program 922. Also within the computer storage 914 is an encrypted virtual disc 924. The encrypted virtual disc 924 contains a decryption-master-boot-record 920, a decryption program 922, and an at least partially encrypted virtual disc image 923. The encrypted virtual disc 924 may also contain an at least partially encrypted virtual disc image. The computer memory 916 contains an encryption tool 926. An encryption tool 926 is a software module or program containing machine executable instructions that cause the processor 910 to create the encrypted virtual disc 924 using the unencrypted virtual disc 918, the decryption-master-boot-record 920, and the decryption program 922. The encryption tool 926 may be used to implement the methods illustrated in FIGS. 4 and 6. In some embodiments the computer memory 916 also contains a cryptographic module and a cryptographic credential generation module 930. The cryptographic module 928 is used for encrypting the unencrypted virtual disc 918. The cryptographic credential generation module 930 is an optional module and may be used for generating cryptographic credentials. For instance the cryptographic credential generation module may be used to generate a cryptographic key pair for an asymmetric encryption algorithm.

The second computer system 902 also contains a processor 932. The processor 932 is connected to the network interface 908 and the user interface 934. The processor 932 is also connected to computer storage 936 and computer memory 938. The computer storage 936 contains the encrypted virtual disc 924 from the first computer system 900. In this embodiment the network connection 904 was used to transfer the encrypted virtual disc 924. Also within the computer storage 936 is an encryption cryptographic key 944. Computer memory 938 contains a virtualization module 942. The virtualization module 942 allows the processor 932 to run and operate a virtual computer system. As can be seen, all that is needed to decrypt the encrypted virtual disc 924 is the virtualization module 942 and the cryptographic key 944. This Fig. also illustrates how an end user may be able to decrypt the encrypted virtual disc 924 without the aid of an operator.

The invention claimed is:

1. A method for encrypting a virtual disc containing a virtual disc image, the method comprising:
    increasing a size of the virtual disc such that a decryption-master-boot-record and a decryption program can be included on the virtual disc along with the virtual disc image;
    copying a first part of the virtual disc image to a portion of free memory blocks added by increasing the size of the virtual disc, wherein the first part of the virtual disc image was originally stored in first ordered memory blocks of the virtual disc;
    writing the decryption-master-boot-record and the decryption program to a portion of the virtual disc that originally contained the first part of the virtual disc image, such that the decryption-master-boot-record is stored in one or more of the first ordered memory blocks within the virtual disc and such that the decryption program is stored in one or more memory blocks directly following the one or more memory blocks used to store the decryption-master-boot-record; and
    encrypting at least a portion of the virtual disc image, wherein the decryption program is provided to decrypt the at least partially encrypted virtual disc image in accordance with a cryptographic key.

2. The method of claim 1, wherein the increased size of the virtual disc is large enough to store at least the equivalent of the decryption-master-boot-record and two copies of the decryption program.

3. The method of claim 1, wherein encrypting at least the portion of the virtual disc image comprises selectively encrypting blocks of the virtual disc image according to a predetermined block encryption list.

4. The method of claim 1, wherein encrypting at least the portion of the virtual disc image comprises examining each block of the virtual disc image to create a list of unused blocks, wherein a particular block is encrypted only if the particular block is not found in the list of unused blocks.

5. A computer-readable storage device containing machine executable instructions that when executed by a processor cause the processor to encrypt a virtual disc containing a virtual disc image,
wherein execution of the machine executable instructions causes the processor to perform the actions of:
increasing a size of the virtual disc such that a decryption-master-boot-record and a decryption program can be included on the virtual disc along with the virtual disc image;
copying a first part of the virtual disc image to a portion of free memory blocks added by increasing the size of the virtual disc, wherein the first part of the virtual disc image was originally stored in first ordered memory blocks of the virtual disc;
writing the decryption-master-boot-record and the decryption program to a portion of the virtual disc that originally contained the first part of the virtual disc image, such that the decryption-master-boot-record is stored in one or more of the first ordered memory blocks within the virtual disc and such that the decryption program is stored in one or more memory blocks directly following the one or more memory blocks used to store the decryption-master-boot-record; and
encrypting at least a portion of the virtual disc image, wherein the decryption program is provided to decrypt the at least partially encrypted virtual disc image in accordance with a cryptographic key.

6. The computer-readable storage device of claim 5, wherein the virtual disc image is divided into blocks, wherein the blocks are selectively encrypted in accordance with a predetermined block encryption list.

7. The computer-readable storage device of claim 5, wherein the virtual disc image is divided into blocks, wherein execution of the instructions causes the processor to examine each of the blocks and create a list of unused blocks, and wherein particular blocks are encrypted only if they are not found in the list of unused blocks.

* * * * *